United States Patent [19]

Welch et al.

[11] Patent Number: 4,979,441
[45] Date of Patent: Dec. 25, 1990

[54] PULSATION DAMPENER

[76] Inventors: Elmer S. Welch, P.O. Box 879, Silver Lake, Wis. 53170; Douglas B. Edwards, R.R. 4 Box 202B, West Burlington, Iowa 52655

[21] Appl. No.: 439,258

[22] Filed: Nov. 20, 1989

[51] Int. Cl.$^5$ .................. A23C 3/02; F16L 55/04
[52] U.S. Cl. ........................ 99/453; 138/36; 417/540
[58] Field of Search .............. 138/26, 30; 99/452, 99/453, 454; 220/85 B; 181/237; 417/540

[56] References Cited

U.S. PATENT DOCUMENTS

| | | |
|---|---|---|
| 2,712,831 | 11/1948 | Day . |
| 2,875,788 | 3/1959 | Pier ........................ 138/30 |
| 2,878,835 | 3/1959 | Peterson .................. 138/30 |
| 2,908,294 | 10/1959 | Di Mattia et al. ........ 138/30 |
| 3,165,123 | 1/1965 | Hawkins . |
| 3,353,560 | 11/1967 | McCulloch ............. 138/30 |
| 4,088,154 | 5/1978 | Patton et al. . |
| 4,186,775 | 2/1980 | Sankichi Muroi . |
| 4,497,388 | 2/1985 | Dexter .................. 181/237 |
| 4,732,176 | 3/1988 | Sugimura ............... 138/30 |
| 4,759,387 | 7/1988 | Arendt .................. 138/30 |

Primary Examiner—James E. Bryant, III
Attorney, Agent, or Firm—Dressler, Goldsmith, Shore, Sutker & Milnamow, Ltd.

[57] ABSTRACT

A pulsation dampener useful to dampen pressure pulsations in milk flowing between a reciprocating-piston pump and a homogenizer. A rigid tube having a perforated portion is surrounded by an elastomeric sleeve. A rigid sleeve surrounds the elastomeric sleeve. Mounting ferrules are welded to opposite ends of the rigid sleeve. Annular beads at opposite ends of the elastomeric sleeve fit into annular grooves in the mounting ferrules. When matching ferrules are clamped tightly to the mounting ferrules, parts of the elastomeric sleeve are displaced, so as to form seals around the rigid tube. The rigid tube, the mounting ferrules and the elastomeric sleeve respectively are configured so as to permit the rigid tube to be axially withdrawn from or inserted into the elastomeric sleeve, without substantial interference, when the matching ferrules are removed.

9 Claims, 3 Drawing Sheets

PULSATION DAMPENER

TECHNICAL FIELD OF THE INVENTION

This invention pertains to a clean-in-place pulsation dampener useful to dampen pressure pulsations in a flowing fluid, in a food, pharmaceutical, or other application requiring sanitary handling of the flowing fluid. As an example, the fluid may be milk flowing between a reciprocating-piston pump and a homogenizer.

BACKGROUND OF THE INVENTION

Generally, in fluid-piping systems, pressure pulsations are known to occur in fluids being pumped by reciprocating-piston pumps. Such pulsations are known to occur even if pumps with multiple pistons having staggered cycles are used to pump fluids into common lines. It is known to use pulsation dampeners to dampen such pulsations. Pulsation dampeners may be also called pressure shock absorbers or fluid desurgers.

Typically, as known heretofore, pulsation dampeners are not designed for being cleaned in place, i.e., for being cleaned without disassembly. Rather, such pulsation dampeners have interior regions where products can collect, so as to form contaminants in subsequent operations with different products. Moreover, such pulsation dampeners cannot be easily disassembled for inspection, cleaning, or repair.

As exemplified in Day U.S. Pat. No. 2,712,831, a pulsation dampener comprises a pipe having a perforated portion, a flexible sleeve surrounding the perforated portion of the pipe, and a cylindrical sleeve surrounding the flexible sleeve. The cylindrical sleeve and rings welded to its ends define a gas-tight chamber separated from the pipe by the flexible sleeve. The rings are bolted to collars associated with the pipe.

Gas pressure in the chamber is controlled. The flexible sleeve expands and contracts radially, against gas pressure in the chamber, so as to dampen pressure fluctuations in fluid flowing in the inner pipe. Fluid flows outwardly and inwardly through perforations in the inner pipe as fluid pressure in the inner pipe increases and decreases.

Other examples of pulsation dampeners are disclosed in Hawkins U.S. Pat. No. 3,165,123, Muroi U.S. Pat. No. 4,186,775, and Patton et al. U.S. Pat. No. 4,088,184.

In assembling a pulsation dampener having a flexible sleeve fitted snugly around a pipe, which is rigid, it is difficult to insert the pipe into the flexible sleeve. Similarly, in disassembling the pulsation dampener, it is difficult to withdraw the pipe from the flexible sleeve.

There has been a need, to which this invention is addressed, for a pulsation dampener with improved features enabling the pulsation dampener to be effectively cleaned in place and to be readily assembled, or disassembled for inspection, cleaning, or repair, yet to be effectively sealed when assembled.

SUMMARY OF THE INVENTION

This invention provides a pulsation dampener employing an elastomeric sleeve between an inner, rigid, perforated tube and an outer, rigid sleeve. The pulsation dampener has improved features enabling it to be readily assembled, or disassembled, yet to be effectively sealed when assembled. Sanitary seals are provided, which permit the pulsation dampener to be effectively cleaned in place, i.e., cleaned without disassembly. Thus, the pulsation dampener is useful to dampen pressure pulsations in such products as milk flowing between a pump, such as a reciprocating-piston pump, and a homogenizer. Similarly, the pulsation dampener is useful in a wide variety of food, pharmaceutical, and other applications requiring sanitary handling of a flowing fluid.

In the pulsation dampener, a rigid, perforated tube is provided. The tube defines a conduit for fluid flowing through the pulsation dampener. The tube has a sealing portion, which extends to one end of the tube, and a perforated portion, which extends to the sealing portion. The rigid tube may be similarly provided with a sealing portion extending to its other end.

The perforated portion has an array of small holes, elongate slots, or other perforations. Small holes are preferred for liquids of relatively low viscosities without entrained particulates, e.g., milk. Elongate slots are preferred for liquids of relatively high viscosities and for liquids with entrained particulates. Also an outer, rigid sleeve is provided, which surrounds the perforated portion of the rigid tube. Between the rigid tube and the perforated portion of the rigid tube, a relatively large annular gap is defined.

Moreover, a mounting ferrule and a matching ferrule are provided. The mounting ferrule is integral with a given end of the rigid sleeve. The mounting ferrule has a sealing portion surrounding the sealing portion of the rigid tube. Between the sealing portion of the mounting ferrule and the sealing portion of the rigid tube, a relatively small annular gap is defined. The mounting ferrule has an annular groove opening outwardly in an axial sense and inwardly in a radial sense. The matching ferrule is clampable tightly but removably to the mounting ferrule so as to close the annular groove where the annular groove opens outwardly in an axially sense. A mounting ferrule and a matching ferrule may be similarly provided at the other ends of the rigid tube and the rigid sleeve.

Furthermore, an elastomeric sleeve is provided between the rigid, perforated tube and the outer, rigid sleeve. A sealing portion of the elastomeric sleeve extends to a given end thereof. An annular bead is formed on the sealing portion of the elastomeric sleeve. The annular bead is fitted into the annular groove. Thus, the sealing portion of the elastomeric sleeve is surrounded by the sealing portion of the mounting ferrule. Also, the principal portion of the elastomeric sleeve is surrounded by the rigid sleeve. A sealing portion with an annular bead may be similarly provided at the other end of the elastomeric sleeve.

Additionally, means are provided for clamping the matching ferrule tightly but removably to the mounting ferrule. Similar clamping means are provided at each end of the pulsation dampener if similar mounting and matching ferrules are provided at each end thereof.

The rigid sleeve, the mounting ferrule, the matching ferrule, and the elastomeric sleeve respectively are configured so that a part of the annular bead extends axially from the annular groove when the matching ferrule is removed from the mounting ferrule but is compressed axially by the matching ferrule when the matching ferrule is clamped tightly to the mounting ferrule. Thus, when such part of the annular bead is compressed axially by the matching ferrule, a seal is formed around the sealing portion of the rigid tube.

Preferably, the rigid tube, the mounting ferrule, and the elastomeric sleeve respectively are configured so that the rigid tube can be axially withdrawn from and inserted into the elastomeric sleeve, without significant rubbing or other interference between the elastomeric sleeve and the rigid tube, when the matching ferrule is removed from the mounting ferrule. Thus, the pulsation dampener can be readily assembled, or disassembled, yet can be effectively sealed when assembled.

It is preferred that the mounting and matching ferrules have stepped faces. The stepped face of the matching ferrule matches and interfits with the stepped face of the mounting ferrule, so as to align the mounting and matching ferrules axially when the matching ferrule is clamped tightly to the mounting ferrule. The stepped face of the matching ferrule is adapted to compress the aforesaid part of the annular bead axially when the matching ferrule is clamped tightly to the mounting ferrule.

Also, it is preferred that the matching ferrule has a tubular portion. The tubular portion is aligned axially with the rigid tube when the matching ferrule is clamped tightly to the mounting ferrule. The tubular portion is spaced by an axial gap from the given end of the rigid tube when the matching ferrule is clamped tightly thereto. The rigid tube, the mounting ferrule, the matching ferrule, and the elastomeric sleeve respectively may be then configured so that the aforesaid part of the annular bead is compressed axially by the matching ferrule, so as to effect controlled displacement of a different part of the sealing portion of the elastomeric sleeve radially into the axial gap, when the matching ferrule is clamped tightly to the mounting ferrule. The displaced part forms seals around the rigid tube and around the tubular portion of the matching ferrule.

Preferably, the rigid tube, the mounting ferrule, the matching ferrule, and the elastomeric sleeve respectively are configured so that, when the matching ferrule is clamped tightly to the mounting ferrule, the sealing portion of the elastomeric sleeve is caused to be radially thickened between the sealing portion of the mounting ferrule and the sealing portion of the rigid tube. Thus, a controlled seal is formed in the relatively small annular gap between the sealing portion of the mounting ferrule and the sealing portion These and other objects, features, and advantages of this invention are evident from the following description of a preferred embodiment of this invention, with reference to the accompanying drawings.

DETAILED DESCRIPTION OF PREFERRED EMBODIMENTS

A pulsation dampener 10, as shown in the drawings, constitutes a preferred embodiment of this invention. The pulsation dampener 10 is constructed so that it can be effectively cleaned in place and so that it can be readily assembled, are disassembled, yet effectively sealed when assembled.

Figures 1, 8:
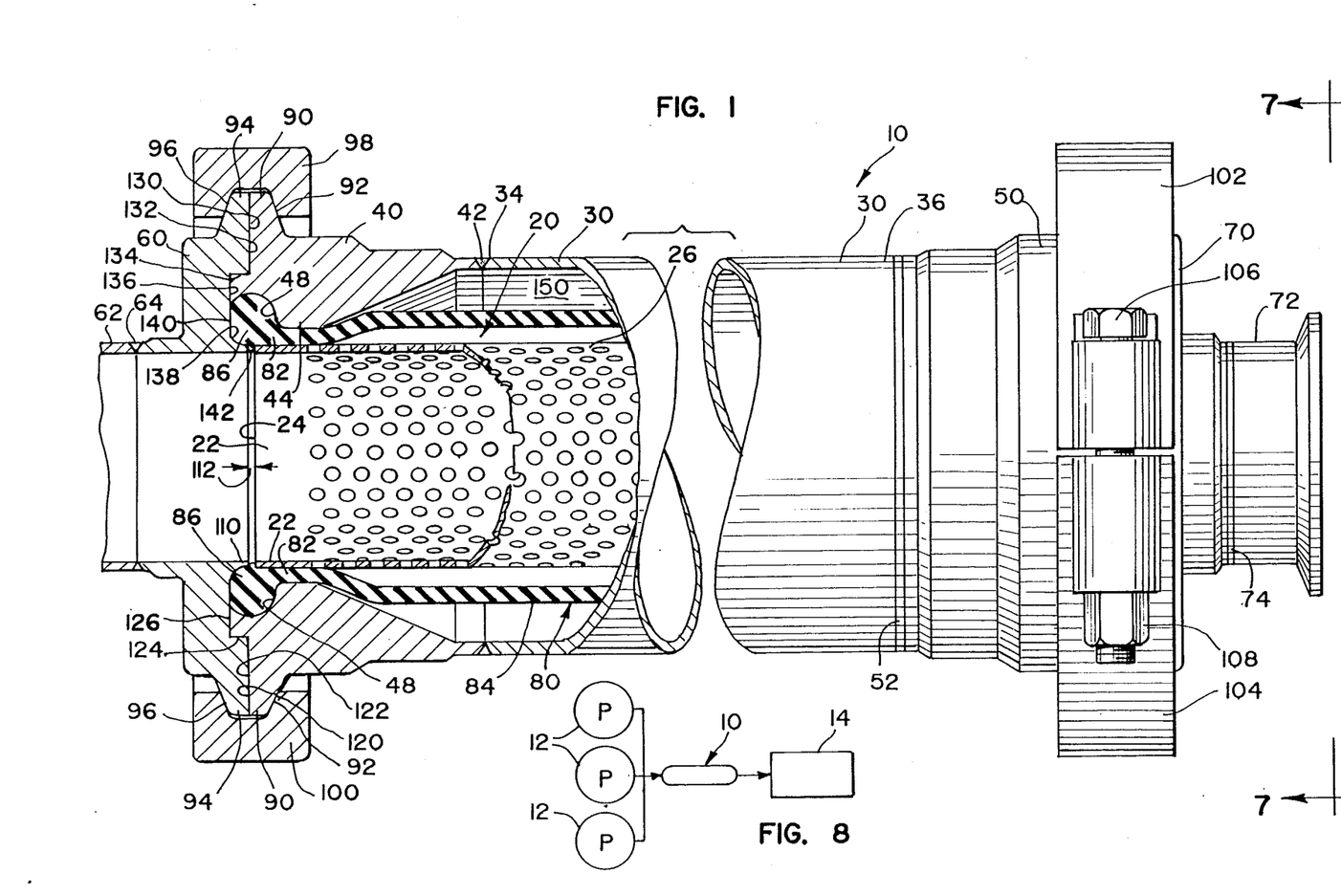
FIG. 1, is a partly cross-sectioned, partly elevational view of a pulsation dampener constituting a preferred embodiment of this invention.
FIG. 8 is a diagrammatic view of the pulsation dampener, as combined with a reciprocating-piston pump, which has three reciprocating pistons, and which is arranged to deliver milk to the pulsation dampener, and with a homogenizer, which is arranged to receive milk from the pulsation dampener.

As described below, the pulsation dampener 10 is provided with sanitary seals, which permit the pulsation dampener 10 to be effectively cleaned without disassembly. Thus, as shown in FIG. 8, the pulsation dampener 10 may be advantageously used to dampen pressure pulsations in milk (not shown) flowing between a reciprocating-piston pump having three reciprocating pistons 12 and a homogenizer 14, in a milk-processing plant. The pistons 12 are arranged to operate with staggered cycles. The pump delivers milk to an inlet end of the pulsation dampener 10. The homogenizer 14 is arranged to receive milk from an outlet end of the pulsation dampener 10.

The inlet end of the pulsation dampener 10 is shown in cross-section in FIG. 1 and in FIGS. 2 through 6. The inlet and outlet ends of the pulsation dampener 10 are similar to each other. A detailed description of its inlet end is given below, along with a partial description of its outlet end.

Figure 5:
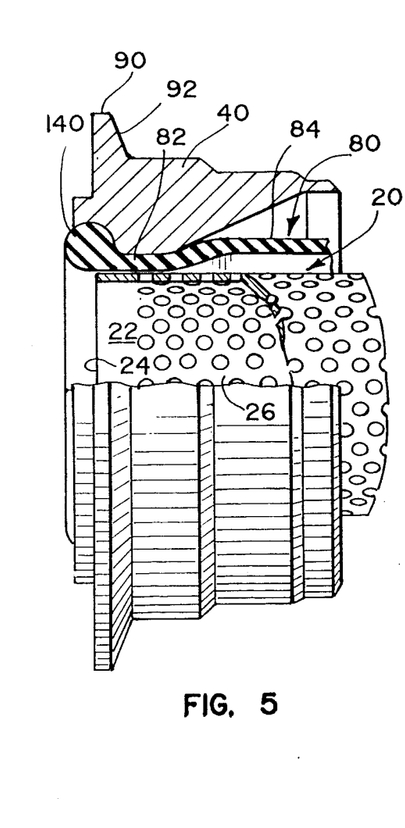
Figure 6:
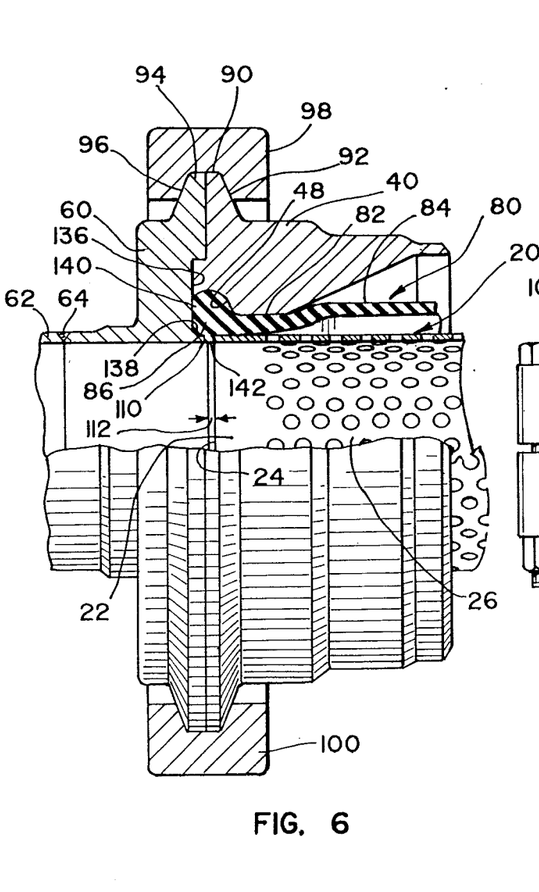

As shown in FIGS. 1, 5, and 6, a rigid tube 20 is provided. The rigid tube 20 defines a conduit for fluid flowing through the pulsation dampeners 10 and defines an axis for the pulsation dampener 10. The rigid tube 20 has a sealing portion 22, which is imperforate. The sealing portion 22 extends to an inlet end 24 of the rigid tube 20. The rigid tube 20 has a perforated portion 26, which extends to the sealing portion 22. The perforated portion 26 has an array of small holes, as shown, although elongate slots (not shown) or other perforations (not shown) may be instead used. Similarly, a sealing portion (not shown) is provided at an outlet end (not shown) of the rigid tube 20.

As shown in FIG. 1, a rigid sleeve 30 is provided, which surrounds the perforated portion 26 of the rigid tube 20. A relatively large annular gap is defined between the rigid sleeve 30 and the perforated portion 26 of the rigid tube 2C. The rigid sleeve 30 has an inlet end 34 and an outlet end 36.

As shown in FIGS. 1 through 6, a mounting ferrule 40 is provided, which is welded to the inlet end 34 of the rigid sleeve 30 at an annular weld 42. Thus, the mounting ferrule 40 is integral with the inlet end 34 of the rigid sleeve 30. The mounting ferrule 40 has a sealing portion 44 surrounding the sealing portion 22 of the rigid tube 20. A relatively small annular gap is defined between the sealing portion 44 of the mounting ferrule 40 and the sealing portion 22 of the rigid tube 20. The mounting ferrule 40 has an annular groove 48 opening axially in an axial sense and inwardly in a radial sense. 10 As shown in FIG. 1, a mounting ferrule 50 is provided. The mounting ferrule 50 is welded to the outlet end 36 of the rigid sleeve at an annular weld 52. The mounting ferrule 50 is similar to the mounting ferrule 40 and has an annular groove (not shown) similar to the annular groove 48. The mounting ferrule 50 is associated similarly with the sealing portion at the other end of the rigid tube 20.

As shown in FIGS. 1 and 6, a matching ferrule 60 is provided. The matching ferrule 60 is clampable tightly but removably to the mounting ferrule 40 so as to close the annular groove 48 where the annular groove 48 opens outwardly in an axial sense. The matching ferrule 60 is welded to an inlet ferrule 62 at an annular weld 64. The inlet ferrule 62 is shown fragmentarily.

Figure 7:
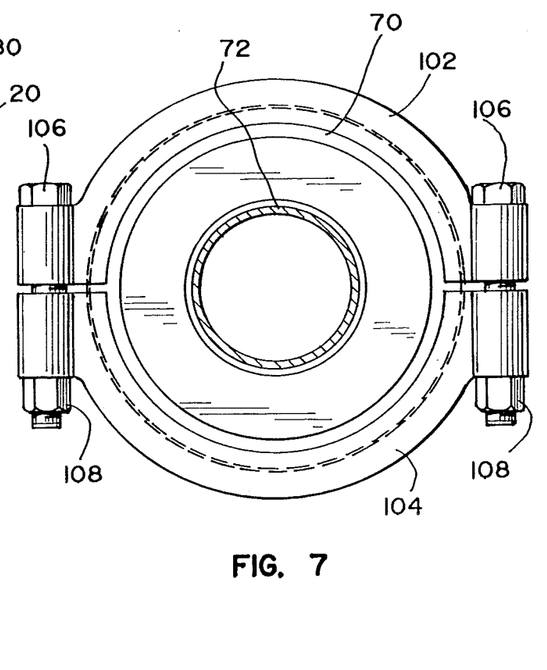
FIG. 7 is an end view taken along line 7—7 in FIG. 1, and on a reduced scale compared to FIGS. 1 through 6, in a direction indicated by arrows.

As shown in FIGS. 1 and 7, a matching ferrule 70 is provided. The matching ferrule 70 is similar to the matching ferrule 60 and is clampable similarly to the mounting ferrule 50. The matching ferrule 70 is welded to an outlet ferrule 72 at an annular weld 74. The outlet ferrule 72 and the inlet ferrule 62 are similar to each other.

As shown in FIGS. 1 through 6, an elastomeric sleeve 80 is provided, which is molded from a suitable natural or synthetic rubber material. The elastomeric sleeve 80 has a sealing portion 82 extending to an inlet end of such sleeve 80, a sealing portion (not shown) extending to an outlet end (not shown) of such sleeve 80, and a principal portion 84 extending to and between the sealing portions of such sleeve 80. The sealing portion extending to the outlet end of the elastomeric sleeve 80 is similar to the sealing portion 82. As shown in FIGS. 1 and 3 through 6, the sealing portion 82 of the elastomeric sleeve 80 is formed with an annular bead 86. The annular bead 86 is fitted into 10 the annular groove 48 so that the sealing portion 82 of the elastomeric sleeve 80 is surrounded by the sealing portion 44 of the mounting ferrule 40. A sealing portion (not shown) with an annular bead (not shown) fitted into the annular groove of the mounting ferrule 50 is provided similarly at the outlet end of the elastomeric sleeve 80.

Preferably, the annular grooves and the annular beads (when uncompressed) are substantially circular in radial section. (other shapes providing similar functions may be instead used.

The mounting ferrule 40 has an annular flange 90 defining a conical surface 92. The matching ferrule 60 has an annular flange 94 defining a conical surface 96. An upper V-clamp 98 and a lower V-clamp 100 fit over the conical surface 92 and over the conical surface 96 and are drawn together by a pair of bolts (not shown) so as to clamp the matching ferrule 60 tightly but removably to the mounting ferrule 40. The mounting ferrule 50 has an annular flange (not shown) similar to the annular flange 90 with a conical surface (not shown) similar to the conical surface 92. The matching ferrule 70 has an annular flange (not shown) similar to the annular flange 94 with a conical surface (not shown) similar to the conical surface 96. An upper V-clamp 102 and a lower V-clamp 104 fit over the conical surface of the annular flange of the mounting ferrule 50 and over the conical surface of the annular flange of the matching ferrule 70 and are drawn together by a pair of bolts 106, onto which nuts 108 are tightened, so as to clamp the matching ferrule 70 tightly but removably to the mounting ferrule 50.

As contemplated by this invention, the rigid tube 20, the mounting ferrules 40, 50, the matching ferrules 60, 70, and the elastomeric sleeve 80 respectively are configured (shaped and dimensioned) so 10 as to permit the pulsation dampener 10 to be readily assembled, or disassembled, yet to be effectively sealed when assembled.

As shown in FIGS. 1 and 6, the matching ferrule 60 has a tubular portion 110. The tubular portion 110 is aligned axially with the rigid tube 20 when the matching ferrule 60 is clamped tightly to t he mounting ferrule 40. The tubular portion 110 is spaced by an axial gap 112 from the inlet end 24 of the rigid tube 20 when the mounting ferrule 60 is clamped tightly to the mounting ferrule 40.

The mounting ferrule 40 has a stepped face 120 with an annular flat surface 122, a cylindrical surface 124, and an annular flat surface 126. The matching ferrule 60 has a stepped face 130 with an annular flat surface 132, a cylindrical surface 134, an annular flat surface 136, and an annular curved surface 138 at the tubular portion 110 of the matching ferrule 60. As shown, the stepped face 130 of the matching ferrule 60 matches and interfits with the stepped face 120 of the mounting ferrule 40, so as to align the mounting ferrule 40 and the matching female 60 axially when the matching ferrule 60 is clamped tightly to the mounting ferrule 40. Thus, the annular flat surface 132 confronts the annular flat surface 122, the cylindrical surface 134 surrounds the cylindrical surface 124, and the annular flat surface 136 confronts the annular flat surface 126. Also, the annular flat surface 136 and the annular curved surface 138 close the annular groove 48 where the annular groove 48 opens outwardly in an axial sense, and where the annular groove 48 surrounds the tubular portion 110 of the matching ferrule 60.

Figure 4:
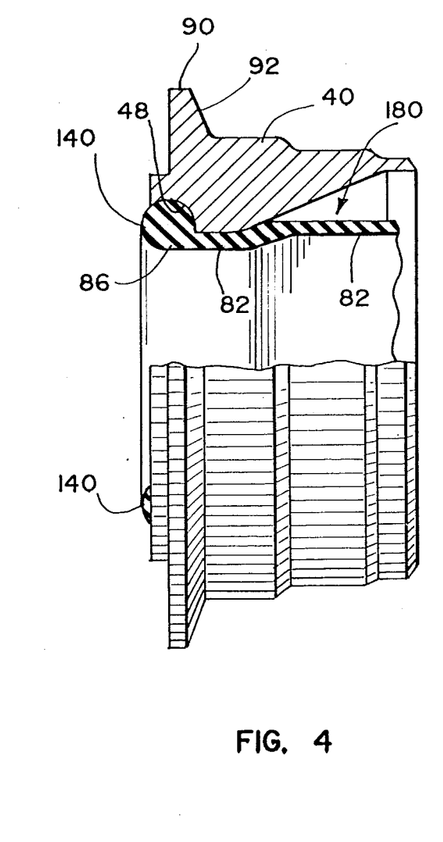

As shown in FIGS. 4 and 5, a part 140 of the annular bead 86 extends axially from the annular groove 48 when the matching ferrule 60 is removed from the mounting ferrule 40. As shown in FIGS. 1 and 6, the same part 140 is compressed axially by the matching ferrule 60, i.e., by the annular flat surface 136 and the annular curVed surface 138, when the matching ferrule 60 is clamped tightly to the mOunting ferrule 40.

Also, when the aforesaid part 140 of the annular bead 86 is compressed axially by the matching ferrule 60, a different part 142 of the sealing portion 82 of the elastomeric sleeve 80 is displaced radially into the annular gap 112 between the tubular portion 110 of the matching ferrule 60 and the inlet end 24 of the rigid tube 20. Thus, the displaced part 142 forms seals around the rigid tube 20, at the inlet end 24, and around the tubular portion 110 of the matching ferrule 60. The displaced part 142 is regarded as a part of the annular bead 86.

Moreover, as shown by a comparison between FIGS. 5 and 6,.when the aforesaid part 140 of the annular bead 86 is compressed axially by the matching ferrule 60, the sealing portion 82 of the elastomeric sleeve 80 is caused to be radially thickened between the sealing portion 44 of the mounting ferrule 40 and the sealing portion 22 of the rigid tube 20. Thus, when the seals noted above are formed, a seal is formed in the relatively small annular gap between the sealing portion 44 of the mounting ferrule 40 and the sealing portion 22 of the rigid tube 20.

As shown in FIG. 5, the rigid tube 20, the mounting ferrule 40, and the elastomeric sleeve 80 are configured (shaped and dimensioned) so that the inner diameter of the elastomeric sleeve 80 (where its inner diameter is smallest) is greater than the outer diameter of the rigid tube 20 when the matching ferrule 60 is removed from the mounting ferrule 40 and the matching ferrule 70 is removed from the mounting ferrule 50. The rigid tube 20 can be axially withdrawn from and inserted 10 into the elastomeric sleeve 80, without significant rubbing or other interference between the elastomeric sleeve 80 and the rigid tube 20. Thus, the pulsation dampener 10 can be readily assembled, or disassembled, yet can be effectively sealed when assembled.

Figure 2:
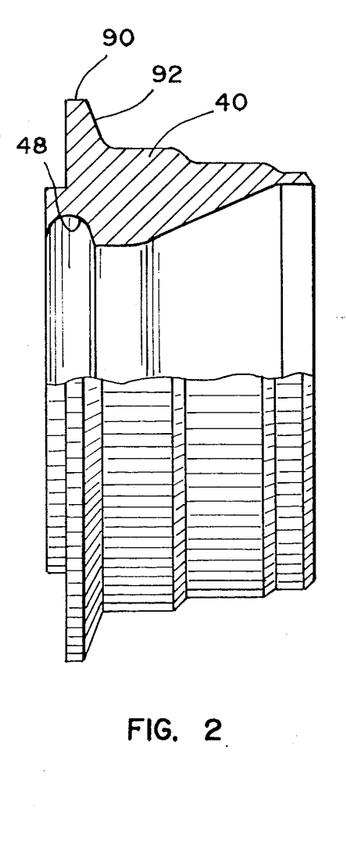
FIGS. 2 through 6 are fragmentary, partly cross-sectional, partly elevational views of one end of the pulsation dampener, at successive stages in its assembly.
Figure 3:
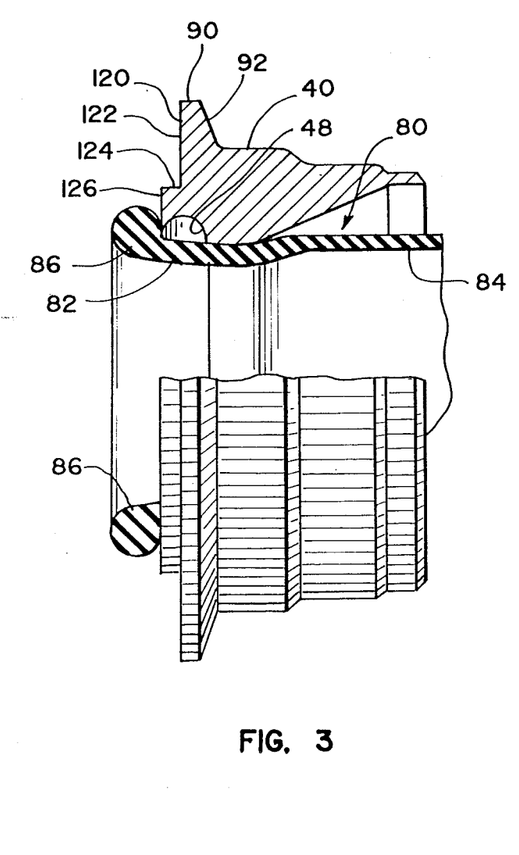

In assembling the pulsation dampener 10, the elastomeric sleeve 80 is assembled with the mounting ferrule 40 so that the annular bead 86 is fitted into the annular groove 48, as shown in successive stages in FIGS. 2 and 4, and with the mounting ferrule 50 in a similar manner. Next, the rigid tube 20 is inserted axially into the elastomeric sleeve 80, as shown in FIG. 5. Finally, the matching ferrule 60 is clamped tightly to the mounting ferrule 40, as shown in FIG. 6, and the matching ferrule 70 is clamped similarly to the mounting ferrule 50.

Pressure pulsations in fluid flowing from the inlet pipe 62, through the pulsation dampener 10, and into the outlet pipe 64 are dampened in the pulsation dampener 10.

Gas pressure surrounding the principal portion 84 of the elastomeric sleeve 80, in a space 150 confined by the mounting ferrule 40, the rigid sleeve 30, the mounting ferrule 50, and the elastomeric sleeve 80, is controlled. A conventional fitting (not shown) may be optionally provided in the rigid sleeve 30, so as to enable gas pressure in the space 150 to be suitably raised, or lowered, if desired.

Usually, the gas in the space 150 is prepressurized to an initial pressure that is less than the anticipated minimum operating pressure of fluid to flow through the pulsation dampener 10, e.g., to about 75% of such minimum anticipated operating pressure. Pressure of fluid flowing through the pulsation dampener 10 then compresses the gas in the space 150 to an equilibrium pressure.

The principal portion 84 of the elastomeric sleeve 80 expands and contracts radially, against gas pressure in the space 150, so as to dampen pressure pulsations in fluid flowing through the rigid tube 20. Fluid flows outwardly and inwardly through perforations in the perforated portion 26 of the rigid tube 20 as fluid pressure in the rigid tube 20 increases and decreases.

The seals formed in the pulsation dampener 10, as described above, are sanitary seals. Such seals do not leave interior regions where products can collect and, therefore, permit the pulsation dampener 10 to be effectively cleaned in place, i.e., cleaned without disassembly. Known cleaning solutions are useful to clean the pulsation dampener 10, particularly if pumped through the pulsation dampener 10 in a pulsating manner so as to expand and contract the principal portion 84 of the elastomeric sleeve 80.

The pulsation dampener 10, as described above, is useful particularly in food, pharmaceutical, and other applications where sanitary handling of a flowing fluid is required. The pulsation dampener 10 is useful as well in concrete pumping and other applications requiring the pulsation dampener 10 to be effectively flushed or cleaned in place between uses.

The pulsation dampener 10 may be modified in various ways without departing from the scope and spirit of this invention, as defined by the appended claims.

We claim:

1. A pulsation dampener useful to dampen pressure pulsations in a flowing fluid, the pulsation dampener comprising:
   (a) a rigid tube defining a conduit for such a fluid, the rigid tube defining an axis and having an end, the rigid tube having a sealing portion that extends to the end and a perforated portion that extends to the sealing portion;
   (b) a rigid sleeve having an end and surrounding the perforated portion of the rigid tube so as to define a relatively large annular gap between the rigid sleeve and the perforated portion of the rigid tube;
   (c) a mounting ferrule integral with the end of the rigid sleeve, the mounting ferrule having a sealing portion surrounding the sealing portion of the rigid tube so as to define a relatively small annular gap between the sealing portion of the rigid tube, the mounting ferrule having an annular groove opening outwardly in an axial sense and inwardly in a radial sense;
   (d) a matching ferrule clampable tightly but removably to the mounting ferrule so as to close the annular groove where the annular groove opens outwardly in an axial sense;
   (e) an elastomeric sleeve having an end and having a sealing portion that extends to the end thereof, the elastomeric sleeve having an annular bead formed on the sealing portion thereof, the annular bead being fitted into the annular groove so that the sealing portion of the elastomeric sleeve is surrounded by the sealing portion of the mounting ferrule; an
   (f) means for clamping the matching ferrule tightly but removably to the mounting ferrule;
wherein the mounting and matching ferrules and the elastomeric sleeve respectively are configured so that a part of the annular bead extends axially from the annular groove when the matching ferrule is removed from the mounting ferrule but is compressed axially by the matching ferrule, so as to form a seal around the sealing portion of the rigid tube, when the matching ferrule is clamped tightly to the mounting ferrule; wherein the matching ferrule has a tubular portion, which is aligned axially with the rigid tube and spaced by an axial gap from the end of the rigid tube when the matching ferrule is clamped tightly to the mounting ferrule; and wherein the rigid tuber, the mounting ferrule, the matching ferrule, and the elastomeric sleeve respectively are configured so that the aforesaid part of the annular bead is compressed axially by the matching ferrule, so as to effect controlled displacement of a different part of the sealing portion of the elastomeric sleeve radially into the axial gap, when the matching ferrule is clamped tightly to the mounted ferrule, the displaced part forming seals around the end of the rigid tube and around the end of the tubular portion of the matching ferrule.

2. The pulsation dampener of claim 1 wherein the rigid tube, the mounting ferrule, and the elastomeric sleeve respectively are configured so that the rigid tube can be axially withdrawn from and inserted into the elastomeric sleeve, without significant interference between the elastomeric sleeve and the rigid tube, when the matching ferrule is removed from the mounting ferrule.

3. The pulsation dampener of claim 1 wherein the mounting ferrule has a stepped face and the matching ferrule has a stepped face, which matches and interfits with the stepped face of the mounting ferrule so as to align the mounting and matching ferrules axially when the matching ferrule is clamped tightly to the mounting ferrule; and wherein the stepped face of the matching ferrule is adapted to compress the first-mentioned part of the annular bead axially when the matching ferrule is clamped tightly to the mounting ferrule.

4. The pulsation dampener of claim 1, wherein the different part of the sealing portion of the elastomeric sleeve is a part of the annular bead.

5. The pulsation dampen of claim 1, in combination with a pump, which is arranged to deliver milk into the pulsation dampen, and with a homogenizer, which is arranged to receive milk from the pulsation dampen.

6. A pulsation dampener useful to dampen pressure pulsations in a flowing fluid, the pulsation dampener comprising:
   (a) a rigid tube defining a conduit for such a fluid, the rigid tube defining an axis and having an end, the rigid tube having a sealing portion that extends to the end and a perforated portion that extends to the sealing portion;
   (b) a rigid sleeve having an end and surrounding the perforated portion of the rigid tube to as to define a relatively large annular gap between the rigid sleeve and the perforated portion of the rigid tube;
   (c) a mounting ferrule integral with the end of the rigid sleeve, the mounting ferrule having a sealing portion of the rigid tube so as to define a relatively small annular gap between the sealing portion of the mounting ferrule and the sealing portion of the rigid tube, the mounting ferule having an annular groove opening outwardly in an axial sense and inwardly in a radial sense;
   (d) a matching ferrule clampable tightly but removably to the mounting ferrule so as to close the annular groove where the annular groove opens outwardly in an axial sense;
   (e) an elastomeric sleeve having an end and having a sealing portion that extends to the end thereof, the elastomeric sleeve having an annular bead formed on the sealing portion thereof, the annular bead being fitted into the annular groove so that the sealing portion of the elastomeric sleeve is surrounded by the sealing portion of the mounting ferrule; and
   (f) means for clamping the matching ferrule tightly but removably to the mounting ferrule;
wherein the mounting and matching ferrules and the elastomeric sleeve respectively are configured so that a part of the annular bead extends axially from the annular groove when the matching ferrule is removed from the mounting ferrule but is compressed axially by the matching ferrule, so as to form a seal around the sealing portion of the rigid tube, when the matching ferrule is clamped tightly to the mounting ferrule; wherein the matching ferrule has a tubular portion, which is adapted to be axially aligned with and spaced by an axial gap from the end of the rigid tube when the matching ferrule is clamped tightly to the mounting ferrule; and wherein the rigid tube, the mounting ferrule, the matching ferrule, and the elastomeric sleeve respectively are configured so that the rigid tube can be axially withdrawn from and inserted into the elastomeric sleeve, without significant interference between the elastomeric sleeve and the rigid tube, when the matching ferrule is removed from the mounting ferrule, and so that the aforesaid part of the annular bead is compressed axially by the matching ferrule, so as to effect controlled displacement of a different part of the sealing portion of the elastomeric sleeve radially into the axial gap and so as to cause the sealing portion of the elastomeric sleeve to be radially thickened between the sealing portion of the mounting ferrule and the sealing portion of the rigid tube, thus to form seals around the end of the rigid tube, in the relatively small annular gap between the sealing portion of the mounting ferrule and the sealing portion of the rigid tube, and around the end of the tubular portion of the matching ferrule, when the matching ferrule is clamped tightly to the mounting ferrule.

7. The pulsation dampener of claim 6 wherein the different part of the sealing portion of the elastomeric sleeve is a part of the annular bead.

8. The pulsation dampener of claim 6 in combination with a pump, which is arranged to deliver milk into the pulsation dampener, and with a homogenizer, which is arranged to receive milk from the pulsation dampener.

9. The pulsation dampener of claim 8 wherein the different part of the sealing portion of the elastomeric sleeve is a part of the annular bead.

* * * * *

UNITED STATES PATENT AND TRADEMARK OFFICE
CERTIFICATE OF CORRECTION

PATENT NO. : 4,979,441

DATED : December 25, 1990

INVENTOR(S) : Elmer Scott Welch and Douglas B. Edwards

It is certified that error appears in the above-identified patent and that said Letters Patent is hereby corrected as shown below:

Column 2, line 36, "axially" should be --axial--.

Column 3, line 45, --of the rigid tube inserted after "portion" ending that sentence.

Column 4, line 46, "tube 2C." should be --tube 20.--

Column 4, line 58, "10" should be deleted.

Column 4, line 59, the new sentence in that line should be the beginning of new paragraph.

Column 5, line 24, "10" should be deleted.

Column 5, line 34, left parenthesis should be omitted and "other" capitalized as beginning of new sentence.

Column 5, line 60, "10" should be deleted.

Column 5, line 66, the space should be deleted between the "t" and the "h" in the word "the".

Column 6, line 30, both the "V" in "curved" and the "O" in "mounting" should be lower case letters.

UNITED STATES PATENT AND TRADEMARK OFFICE
CERTIFICATE OF CORRECTION

PATENT NO. : 4,979,441

DATED : December 25, 1990

INVENTOR(S) : Elmer Scott Welch and Douglas B. Edwards

It is certified that error appears in the above-identified patent and that said Letters Patent is hereby corrected as shown below:

Column 6, line 60, "10" should be deleted.

Column 8, line 20, "an" should be --and--.

Column 8, line 35, "tuber" should be --tube--.

Column 8, line 67, "dampen" should be --dampener--.

Column 9, line 1, "dampen" should be dampener--.

Column 9, line 12, "to as" should be --so as--.

Signed and Sealed this

Twenty-eighth Day of July, 1992

Attest:

DOUGLAS B. COMER

Attesting Officer     Acting Commissioner of Patents and Trademarks